US009523587B2

(12) United States Patent
Labate et al.

(10) Patent No.: US 9,523,587 B2
(45) Date of Patent: Dec. 20, 2016

(54) METHOD AND SYSTEM FOR REMOTE METERING THE CONSUMPTION OF ELECTRICITY, WATER OR GAS

(75) Inventors: Diego Labate, Cosenza (IT); Paolo Giubbini, Rom (IT)

(73) Assignee: ENEL DISTRIBUZIONE S.P.A., Rome (IT)

( * ) Notice: Subject to any disclaimer, the term of this patent is extended or adjusted under 35 U.S.C. 154(b) by 1365 days.

(21) Appl. No.: 12/865,813

(22) PCT Filed: Feb. 2, 2009

(86) PCT No.: PCT/EP2009/051131
§ 371 (c)(1),
(2), (4) Date: Nov. 22, 2010

(87) PCT Pub. No.: WO2009/095498
PCT Pub. Date: Aug. 6, 2009

(65) Prior Publication Data
US 2011/0063125 A1    Mar. 17, 2011

(30) Foreign Application Priority Data

Jan. 31, 2008    (EP) .................................... 08001823

(51) Int. Cl.
*G01D 4/00*    (2006.01)
(52) U.S. Cl.
CPC ............. *G01D 4/004* (2013.01); *Y02B 90/242* (2013.01); *Y04S 20/322* (2013.01)
(58) Field of Classification Search
CPC ................................ G01D 4/002; G01D 4/004
USPC ........................................ 340/870.02–870.03
See application file for complete search history.

(56) References Cited

U.S. PATENT DOCUMENTS

| 5,448,230 | A  | * | 9/1995 | Schanker et al. | 340/870.03 |
| 6,195,018 | B1 | * | 2/2001 | Ragle | G08C 15/06 |
| | | | | | 340/870.01 |
| 6,239,722 | B1 | * | 5/2001 | Colton et al. | 340/870.02 |
| 7,176,807 | B2 | * | 2/2007 | Scoggins et al. | 340/870.02 |
| 7,239,250 | B2 | * | 7/2007 | Brian et al. | 340/870.02 |

(Continued)

FOREIGN PATENT DOCUMENTS

| EP | 1 032 238 | 8/2000 |
| EP | 1 032 238 A1 | 8/2000 |

(Continued)

OTHER PUBLICATIONS

International Search Report for PCT/EP2009/051131, mailed Aug. 13, 2009.

(Continued)

*Primary Examiner* — Albert Wong
(74) *Attorney, Agent, or Firm* — Nixon & Vanderhye P.C.

(57) ABSTRACT

The method and devices for remote metering the consumption, of utilities according to the present invention provide the possibility to retrieve a specific amount of data, i.e. consumption data and/or additional data, from remote meters of a remote metering system. The retrieved data provide a data profile in a given time interval than the entire buffer, for example indicative of the consumption characteristics over time at the location of a remote meter or, in the case of a distribution network for electric energy, indicative of a ratio of active and reactive energy consumption at the location of a remote meter over time.

30 Claims, 5 Drawing Sheets

(56) References Cited

U.S. PATENT DOCUMENTS

| | | | |
|---|---|---|---|
| 7,327,998 B2* | 2/2008 | Kumar et al. | 455/405 |
| 7,535,378 B2* | 5/2009 | Cornwall | 340/870.02 |
| 7,884,737 B2* | 2/2011 | Zigdon et al. | 340/870.02 |
| 8,269,651 B2* | 9/2012 | Zigdon et al. | 340/870.11 |
| 2004/0083066 A1 | 4/2004 | Hayes et al. | |
| 2005/0043059 A1 | 2/2005 | Petite et al. | |
| 2006/0164257 A1 | 7/2006 | Giubbini | |
| 2007/0033151 A1 | 2/2007 | Lee, Jr. | |

FOREIGN PATENT DOCUMENTS

| | | |
|---|---|---|
| EP | 1 304 856 | 4/2003 |
| EP | 1654861 | 5/2006 |
| EP | 2 085 749 A1 | 8/2009 |
| JP | 2002-312871 | 10/2002 |
| JP | 2005-164561 | 6/2005 |
| JP | 2004-041000 | 2/2007 |
| JP | 2007-258826 | 10/2007 |
| JP | 2007-535182 | 11/2007 |
| WO | WO 01/93557 | 12/2001 |
| WO | WO 03/055031 | 7/2003 |
| WO | WO 2005/015890 | 2/2005 |
| WO | 2007/030826 | 3/2007 |
| WO | WO 2007/146053 | 12/2007 |

OTHER PUBLICATIONS

Written Opinion for PCT/EP2009/051131, mailed Aug. 13, 2009.
Notification of Transmittal of International Preliminary Report for International Application No. PCT/EP2009/051131 mailed Aug. 3, 2010.
European Examination Report dated Nov. 18, 2015 in EP 08001823.7, 4 pages.
English Summary of Japanese Office Action mailed Jun. 7, 2013 in Japanese Application No. 2010-544723.
English Translation of Russian Official Action dated Jan. 30, 2013 in Russian Application No. 2010136296/28(051570).
European Application No. EP 080018237.7 filed Jan. 31, 2008 (Publ. No. EP 2 085 749 A1); Inventors: Labate et al.

* cited by examiner

METHOD AND SYSTEM FOR REMOTE METERING THE CONSUMPTION OF ELECTRICITY, WATER OR GAS

This application is the U.S. national phase of International Application No. PCT/EP2009/051131 filed 2 Feb. 2009 which designated the U.S. and claims priority to EP Patent Application No. 08001823.7 filed 31 Jan. 2008, the entire contents of each of which are hereby incorporated by reference.

The present invention relates to a method and a system for remote metering the consumption of utilities distributed through a distribution network, e.g. electricity, water or gas distribution network, to a plurality of consumers. The present invention furthermore relates to a concentrator for collecting consumption related data, especially regarding the consumption of utilities, from a plurality of associated remote meters, as well as to a remote meter for measuring the consumption of utilities and for providing consumption related additional data.

In a distribution network for distributing utilities like electricity, water or gas to a large number of consumers spread over a large geographical territory, the consumer sites are typically equipped with a meter for measuring the consumption of the utilities by the associated consumer. The measured consumption will then be the basis for billing the consumer or for any other accounting purposes. Today, there exist public distribution networks for utilities like electricity, water and gas, which make these utilities available to consumers on a nation wide scale. At present, in the majority of the existing distribution networks, the meters located at customer premises require to be read by a human operator at regular intervals, e.g. once per year. Reading the measured consumption with the aid of human interaction has a lot of obvious disadvantages, due to the fact that human resources are expensive and tend to make mistakes when repeatedly performing simple tasks like reading utility meters at a larger number of customer premises.

In order to alleviate problems and costs associated with the reading of the consumption data by human operators, systems have been envisaged for remote metering the consumption of utilities. In a system for remote metering the consumption of utilities as described in WO 03/055031 A or WO 2005/015890, concentrator devices are provided, each of which administrating a certain number of remote meters located at customer premises. The remote meters report the measured consumption data to their associated concentrators. The concentrators in turn communicate with other higher level concentration nodes or directly with centralized management facilities which will further process the collected data, send out bills to the customers and perform other high level administrative tasks relating to the operation of the utility distribution network.

In such a system for remote metering the consumption of utilities, each of the concentrators communicates with a plurality of remote meters in order to collect the measured data and perform tasks related to the administration of the remote meters associated with the concentrator. In order to accomplish the tasks of metering the consumption, reporting data to the concentrator, receiving commands from the concentrator and other activities, a remote meter has a host controller and a program memory for executing programs stored in the program memory.

The present invention has been made to provide further improvements to such remote metering systems, the concentrators and the remote meters of such systems as well as the methods for remote metering employed in such systems.

Accordingly, the present invention provides a method of remote metering the consumption of utilities distributed through a public distribution network to a plurality of consumers, each consumer being associated with at least one remote meter, wherein each of the plurality of remote meters measures a consumption of said utilities and stores consumption related data for reporting such data to a concentrator associated with said plurality of remote meters, said concentrator communicates with said plurality of remote meters in order to collect consumption related data and perform tasks concerning the administration of its associated remote meters, and each of said remote meters comprises a program memory, a controller executing programs stored in said program memory and a data element memory for storing data elements related to the consumption of said utilities and at least indicative of the consumption of said utilities; characterized by a remote meter transmitting an amount of consumption related data to said concentrator upon a request from said concentrator, said request indicating the amount of consumption related data, said amount being determined on the basis of status data of said remote meter.

Further, the present invention provides a system for remote metering the consumption of utilities distributed through a public distribution network to a plurality of consumers, the system comprising a plurality of remote meters measuring a consumption of utilities, each of said remote meters having a controller and a program memory, said controller executing programs stored in said program memory, and a data element memory for storing data elements related to the consumption of said utilities and at least indicative of the consumption of said utilities; and a concentrator communicating with said plurality of remote meters in order to collect consumption data and perform tasks related to the administration of associated remote meters; wherein said remote meters of the system are adapted to perform the operation of transmitting an amount of consumption related data to said concentrator upon a request from said concentrator, and wherein said concentrator said is adapted to request the amount of consumption related data and to determine said amount on the basis of status data of said remote meter.

Further, the present invention provides a concentrator for collecting data regarding the consumption of utilities from a plurality of remote meters, each having a controller and a program memory, said controller executing programs stored in said program memory, and a data element memory for storing data elements related to the consumption of said utilities and at least indicative of the consumption of said utilities, said concentrator comprising a communication interface for communicating with said plurality of remote meters; a controller for processing data received from said remote meters through said communication interface; wherein said concentrator is adapted to perform the operations of requesting status data from a selected one of said remote meters; computing an amount of consumption related data to be requested and received from said selected remote meter on the basis of said status data; and receiving said amount of consumption related data from said selected remote meter.

Still further, the present invention provides a remote meter for measuring the consumption of utilities, comprising a communication interface for transmitting data concerning the measured consumption of utilities to a concentrator; a consumption data element storage means comprising storage locations for storing data elements at least indicating the consumption measured at the time of storing a respective one of said data elements; a time value storage means for storing a time value corresponding to the date/time of storing of said most recent data element; and a controller being arranged to control the operation of the remote meter relating to the measuring of the consumption of utilities such that periodically, indicated by a stored time parameter, a data element corresponding to the measured consumption of utilities is stored in a respective subsequent one of said storage locations of said circular storage means, and the time value stored in said time value storage means is updated to correspond to the date/time of storing of said most recent data element; and the transmitting of data concerning the measured consumption of utilities to said concentrator via said communication interface such that upon a respective request from said concentrator said time value is transmitted to said concentrator, and a number of data elements stored in said storage locations is transmitted to said concentrator, said number being determined by said concentrator.

According to all aspects of the present invention described above it is possible to retrieve a specific amount of data, i.e. consumption data and/or additional data, from remote meters of a remote metering system. The retrieved data provide a data profile, for example indicative of the consumption characteristics over time at the location of a remote meter or, in the case of a distribution network for electric energy, indicative of a ratio of active and reactive energy consumption at the location of a remote meter over time.

The above aspects and advantages of the invention will be further elaborated in the following description of preferred embodiments of the present invention with reference to the accompanying drawings.

In the following, the present invention will be explained in greater detail while reference is made frequently to a remote metering system in which the consumption of electric energy is measured and respective data are collected in remote meters and transmitted to concentrators. However, it is understood that the invention can be used in very different or relatively similar remote metering systems and with respect to various kinds of data which are collected in the remote meters of such systems.

As mentioned before, FIG. 1 shows an embodiment of a system for remote metering the consumption of electricity in an electricity distribution network which comprises a high voltage network portion HV, a medium voltage network portion MV as well as a low voltage network portion LV. PP denotes a power plant which feeds electric power into the high voltage network portion HV for distribution over a large geographical area. TP denotes a primary substation which transforms the high voltage carried on the high voltage network portion into a medium voltage in order to feed a section of the medium voltage network portion MV. ST denotes a secondary substation, which connects the medium voltage network portion MV with a network section 1 in the low voltage network portion LV. The secondary substation ST comprises a secondary transformer TS which transforms the medium voltage of e.g. 20 kV into a low voltage of e.g. 220 V for distribution to a plurality of consumer sites H1, H2, . . . , Hn. Each consumer site H1, . . . , Hn comprises a remote meter RM which is connected between the low voltage network section 1 and a power line 2 which distributes the electric energy at the customer premises to a plurality of electricity consumers L1, L2, . . . , Lk like lamps, washing machines, dish washers, television sets in case of domestic consumers or industrial facilities like machine tools in case of commercial consumers.

Figure 1:
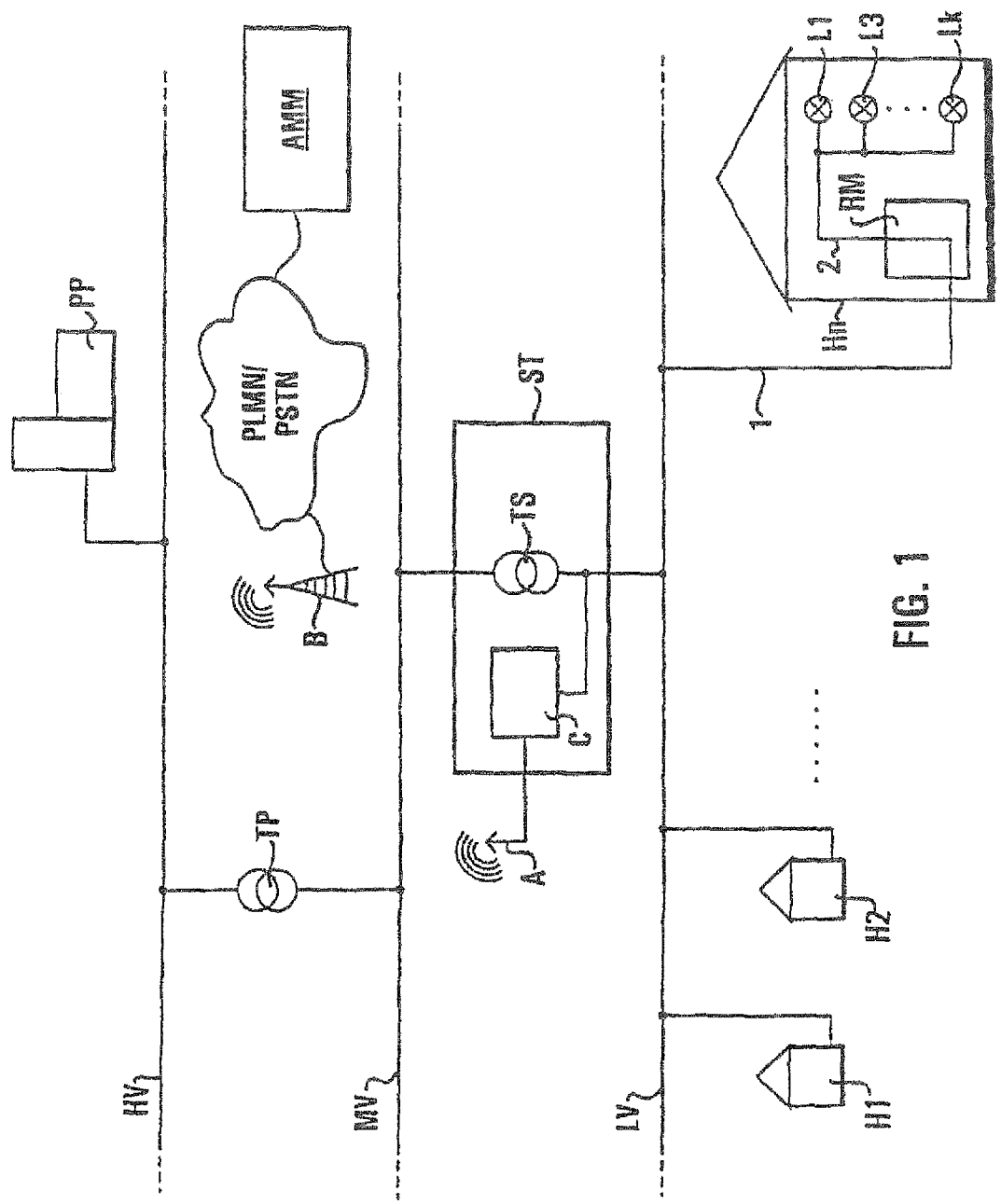
FIG. 1 shows an example of a distribution network comprising a concentrator and remote meters according to the invention.

In the embodiment shown in FIG. 1, the secondary substation ST comprises a concentrator C located at the premises of the secondary substation ST. The concentrator C is connected to the low voltage network section fed by the secondary substation ST in order to communicate with the remote meters RM at the customer premises H1, H2, . . . , Hn via power line carrier using the low voltage network section 1 for the transmission of communication signals between the concentrator C and its associated remote meters RM.

AMM denotes a centralized management facility for administrating a large number of consumers connected to the electricity distribution network shown in FIG. 1. This centralized management facility AMM gathers various data, e.g. consumption data, from the large number of consumers and performs activities like billing the consumers in accordance with the measured consumption reported by the remote meters RM at the customer premises H1, H2, . . . , Hn to the concentrator C. The concentrator C collects the reported data, including for example consumption data, from the remote meters, suitably processes and buffers the reported data and transmits data in a suitable format and at a suitable timing to the centralized management facility AMM. The AMM in return transmits commands, requests and other data to the concentrators C in the network of FIG. 1 in order to control and administrate the operation of the concentrators C and the remote meters RM in the network.

In the embodiment of FIG. 1, the communication between the concentrators C and the centralized management facilities AMM takes place through a public telecommunication network, which is most preferably a wireless or mobile telecommunication network like the GSM network. To this end, the concentrator C comprises a GSM modem device not shown in FIG. 1 which is connected to an antenna A. The modem communicates in a wireless fashion with a base station B which forms a part of the public mobile telephone network PSTN/PLMN in FIG. 1. The public telephone network PSTN/PLMN in turn is connected with the centralized management facilities AMM. However, the communication between the concentrators C and the centralized management facilities AMM may be performed also in a different manner using alternative communication networks, e.g. POTS (plain old telephone system), the Internet or the power lines of the electricity distribution network.

Figure 2:
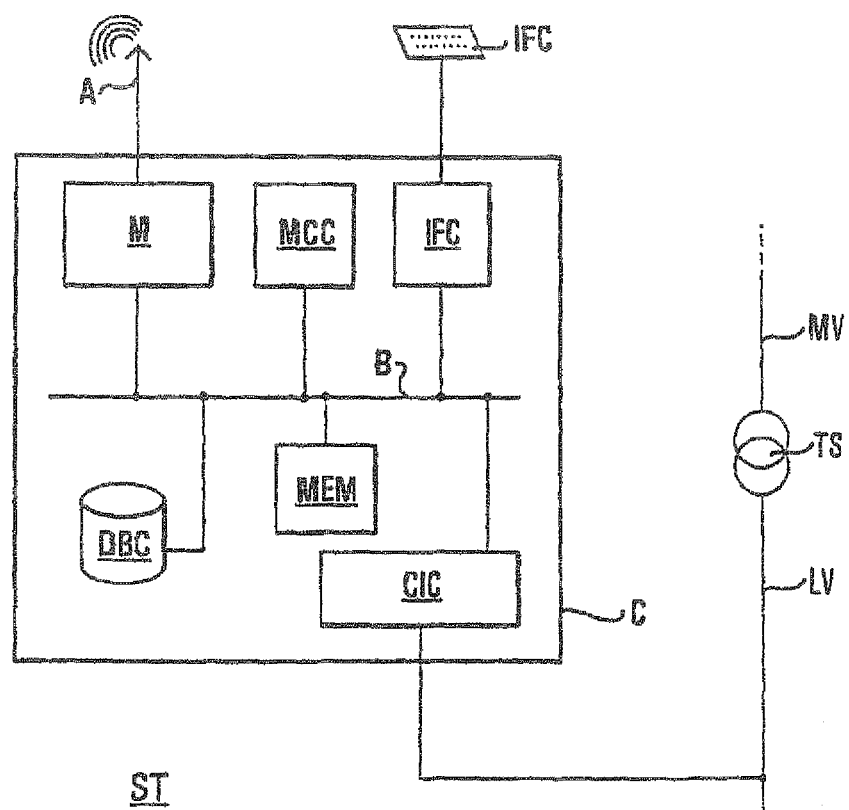
FIG. 2 shows an embodiment of a concentrator according to the invention.

FIG. 2 shows an embodiment of the concentrator C located at the secondary substation ST of the network shown in FIG. 1. The concentrator C comprises a controller, e.g. a micro controller MCC which is connected with a program memory MEM through a data bus B. In FIG. 2 DBC denotes means for storing data collected by the concentrator C from the associated remote meters RM as well as other data. The data storing means DBC may be implemented as a random access memory (RAM), a hard disc drive (HD), network attached storage (NAS) or any other suitable data storage device, e.g. a flash memory. The data storing means DBC is connected with the micro controller MCC of the concentrator C and the program memory MEM through the data bus B. In FIG. 2 M denotes a GSM modem under control of the micro controller MCC through the data bus B. The GSM modem M is connected with the antenna A for wireless communication in a GSM network.

In FIG. 2 CIC denotes a communication interface of the concentrator C. The communication interface CIC serves to enable the concentrator C to communicate with its associated remote meters RM through the power line of the low voltage network section LV to which both the concentrator and its associated remote meters are connected. The communication interface CIC receives data from the data bus B under control of the micro controller MCC for transmission to one, some or all of the associated remote meters either in unicast, multicast or broadcast mode depending on the content of the message to be transmitted. If data from the concentrator are intended for transmission to a particular remote meter only (unicast mode), the data message transmitted through the communication interface CIC will contain a specific remote meter address. A message transmitted in multicast mode will contain the address of a group of remote meters which are intended to receive the particular multicast message. In broadcast mode, messages transmitted through the communication interface CIC will bear an identifier that they are broadcast messages intended to be received by any recipient, or they may simply not include a specific destination address. Of course, any kind of message protocol is suitable for implementing the CIC which includes the possibility to transmit messages in unicast, multicast and/or broadcast transmission modes. These functions of the communication interface CIC are performed under control of the micro controller MCC. The communication interface CIC takes the data to be transmitted from the data bus B and converts the data into a physical signal suitable for transmission over the low voltage power lines. Moreover, the communication interface CIC also acts as a receiver interface for receiving power line communication signals from the remote meters RM which are addressed to the concentrator C. To this end, the communication interface CIC compares the address of messages sent by remote meters on the LV network section with its own address. If the communication interface CIC finds a message to be addressed to the concentrator C, it will receive the message from the LV network section and pass it on to the micro controller MCC and/or other components of the concentrator C for further processing.

While the concentrator according to the embodiment in FIG. 2 has an internal GSM modem M, it is of course possible to employ an external modem instead. In this case, a separate modem interface may be provided in the concentrator for connecting the external GSM modem, or the interface IFC may be used for this purpose.

Other elements in FIG. 2 which correspond to elements already described in connection with FIG. 1, have been denoted with the same reference numerals such that in this respect reference can be made to the description of FIG. 1.

When operating a utility distribution network with remote metering facilities as shown in FIG. 1, the low voltage network, although advantageously used for communication between the concentrator C and a remoter meter RM, is not perfectly suited for communication purposes as some of electric consumers L1, L2, . . . , Lk cause disturbances of various kinds negatively influencing the communication operations and causing a need for data to be transmitted repeatedly. Due to such negative influences the communication between the concentrator C and a remote meter RM should be limited to only such data actually required from the concentrator C or the centralized management facilities ANM especially in view of the relatively high number of remote meters RM typically administered by a single concentrator C.

In fact, similar considerations apply with respect to the communication between the concentrator C and the centralized management facilities AMM when performed via power lines. Additionally, communication between the concentrator C and the centralized management facilities AMM is costly when performed via wireless communication systems, for example mobile telephone systems like GSM. Therefore, any reduction of the volume of communication between all levels of the remote metering system is generally desirable.

On the other hand, meaningful information about the status and the consumption at the remote meters should be available in the centralized management facilities AMM whenever required. Therefore, transmission of specific data must be carried out, while said data should be selected carefully to avoid transmission of superfluous or redundant data.

According to a general aspect of the invention, the concentrator C computes on the basis of status data, which the concentrator C requests and receives from a remote meter RM in a first communication process, the amount of data, for example consumption related data, to be requested and received from a remote meter RM in a second communication process. In a preferred embodiment of this aspect of the invention, as described further below, samples of energy/power related data collected in a remote meter are transmitted during the second communication process to provide data equivalent to a load profile of the remote meter. In an electricity distribution network, the profile characterizes the consumption load to the network.

Figure 3:
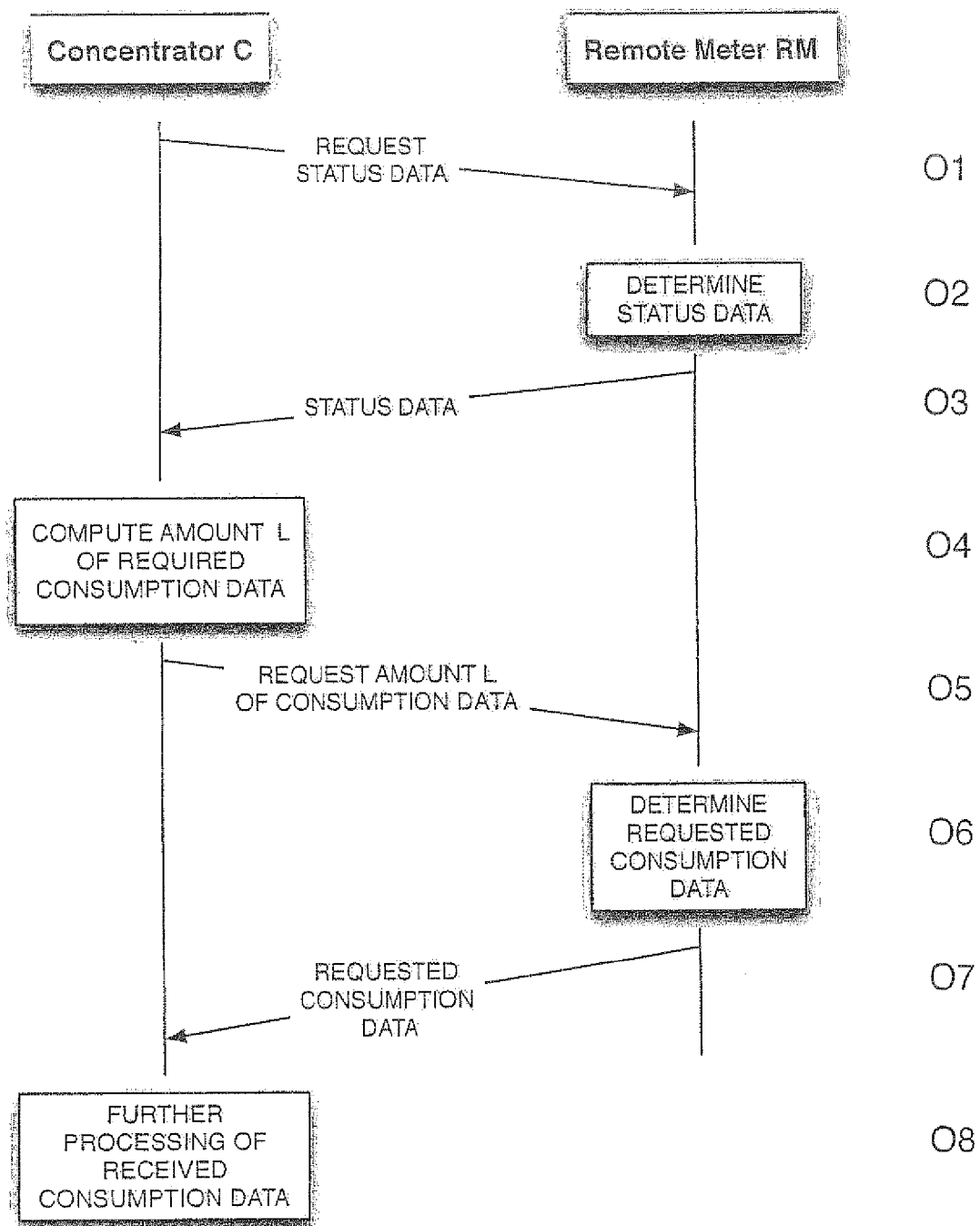
FIG. 3 shows a diagram illustrating an example of a communication between a concentrator and a remote meter according to the invention.

FIG. 3 shows a diagram to illustrate by means of a preferred example the communication between the concentrator C and a remote meter RM.

In a first communication operation O1 the concentrator C sends a message to the remote meter RM requesting status data on the basis of which the concentrator C determines the kind and the amount of data to be requested in a subsequent operation. Upon receipt of said message, the remote meter RM determines the status data in a processing operation O2, preferably by reading out respective storage locations in a storage device as will be explained further below with respect to an embodiment of a remote meter according to the invention. The remote meter RM transmits to the concentrator C a message comprising the status data in a second communication operation O3.

Taking into consideration the received status data, the concentrator C determines in a processing operation O4 the amount L of data, for example consumption data, to be requested from the remote meter RM.

In a preferred embodiment, the concentrator C determines the amount L of data by further referring to one or more predetermined values previously received from the centralized management facilities AMM and stored in a suitable storage location in the concentrator C. One of the predetermined values may be time related to define a consumption period, i.e. one week, one month, one year etc, for which the consumption should be retrieved. Based on the predetermined values and on received status data, the amount L of data to be requested from the remote meter RM is determined by the concentrator C.

In a third communication operation O5, the concentrator C transmits a message to the remote meter RM providing the remote meter RM with the amount L of data, including especially consumption data, to be transmitted and requests the remote meter RM to transmit the amount L of consumption related data. The remote meter RM obtains the requested amount L of data, including especially consumption data, in a processing operation O6. The remote meter RM determines the requested data, especially consumption data, preferably by reading out respective storage locations in a storage device as will be further explained with respect to an embodiment of a remote meter described below.

In a fourth communication operation O7, the remote meter RM transmits the requested data to the concentrator C. The concentrator C performs further processing of said received data, especially intermediate storing and error checking, and transmits data to the AMM based on the received data, in a processing operation O8. Alternatively, the concentrator C can be arranged to allow the AMM to access the data directly such that the data is retrieved by the AMM from a file stored in the data storage means DBC of the concentrator C, for example by downloading said file to the AMM.

According to the invention, the actual communication between the concentrator C and a specific one of the remote meters RM is reduced since the transmitted data is limited to such an amount of data as it is required with respect to said specific one of the remote meters administered by the concentrator C. The amount may differ from one remote meter to the other and is therefore determined by the concentrator C taking into account the status data of each individual remote meter. However, under certain conditions, for example when the same or similar information is required for more than one or all remote meters RM, the amount L of data computed by the concentrator C can be identical for said remote meters RM.

On the other hand, the concentrator C may request the remote meter RM to transmit any amount of data, for example consumption data over one or more given periods of time, i.e. time intervals. As far electricity distribution networks are concerned the concentrator C may request the remote meter RM to transmit data regarding active and reactive energy or positive/negative reactive energy separately.

The records maintained by the concentrator C with respect to the associated remote meters RM are preferably stored in the data storage means DBC of the concentrator C (see FIG. 2). Typically, the records are stored in one or more table which may be part of a database maintained by the concentrator C. According to an example of said table a record has the following structure.

| Remote Meter ID | Time Value | Indicator | Numeric Value | Measurement Values |
|---|---|---|---|---|
| RM-ID | TV | ID | NM | MV1, MV2 ... MV(L) |

The status data may comprise a time value TV which indicates date and time of a last measured consumption of energy/power provided that the consumption of energy/power is measured periodically in the remote meter and that the measurement results are stored in a storage location of a storage device of the remote meter. Further, the status data may comprise an indicator ID pointing at the storage location of the last measured consumption value. Still further, the status data may comprise a numeric value NM indicating the number of stored measured consumption values. Preferably, the status data comprise one or more of the before mentioned values, i.e. a time value TV, an indicator ID or a numeric value NM.

Preferably, the amount L of consumption data is determined further on the basis of a time interval INTERVAL for which consumption data are required, for example a billing period (a week, a month etc.) or a maintenance cycle.

According to a first option, the concentrator C considers the time value TV of said status data as a time value defining the end of a time period (time interval) and computes a start time value. The concentrator C transmits the start time value to the remote meter RM requesting consumption data measured and stored with respect to the period defined by said start date/time and said end date/time. The start time value defines and therefore corresponds to the amount L of consumption data MV1, MV2 ... MV(L) to be transmitted by the remote meter RM. For this option it is sufficient if the status data transmitted by the remote meter RM comprise the time value TV only.

According to a second option, reducing the processing of data at the remote meter, the concentrator C computes a number of consumption value storage locations the content of which is to be transmitted by the remote meter RM. By transmitting the number L of storage locations the receiving remote meter RM can perform a reading out of the storage location containing the last measured consumption value and of L−1 precedent storage locations containing the previously measured consumption values, respectively. In a further refined alternative of this option, the concentrator C computes the storage locations or range of storage locations from which the remote meter RM should read out said consumption values, so that the status data preferably comprise an indicator pointing at the storage location of the last measured consumption value.

According to a third option, the concentrator C computes the number L of consumption value storage locations the content of which is to be transmitted by the remote meter RM but additionally compares the number L with the numeric value of the received status data NM indicating the number of stored consumption values.

According to all options, the remote meter RM transmits a number of consumption values MV1, MV2 ... MV(L), for example samples of energy consumption, which have been measured and stored in several periodically repeated measurements so that the consumption data transmitted by said remote meter RM may be regarded as a consumption profile since the transmitted data not only comprise an actual consumption value but also previous consumption values. Still, the amount L of data transmitted from the remote meter RM to the concentrator C and consequently the amount of data transmitted from the concentrator C to the centralized management facilities AMM is reduced when compared with the entire meter RM consumption buffer, since the amount L is determined by the concentrator C according to the specific requirements/parameters and on the basis of the status data. The specific requirements/parameters are previously stored inside the concentrator C by the AMM.

Figure 4:
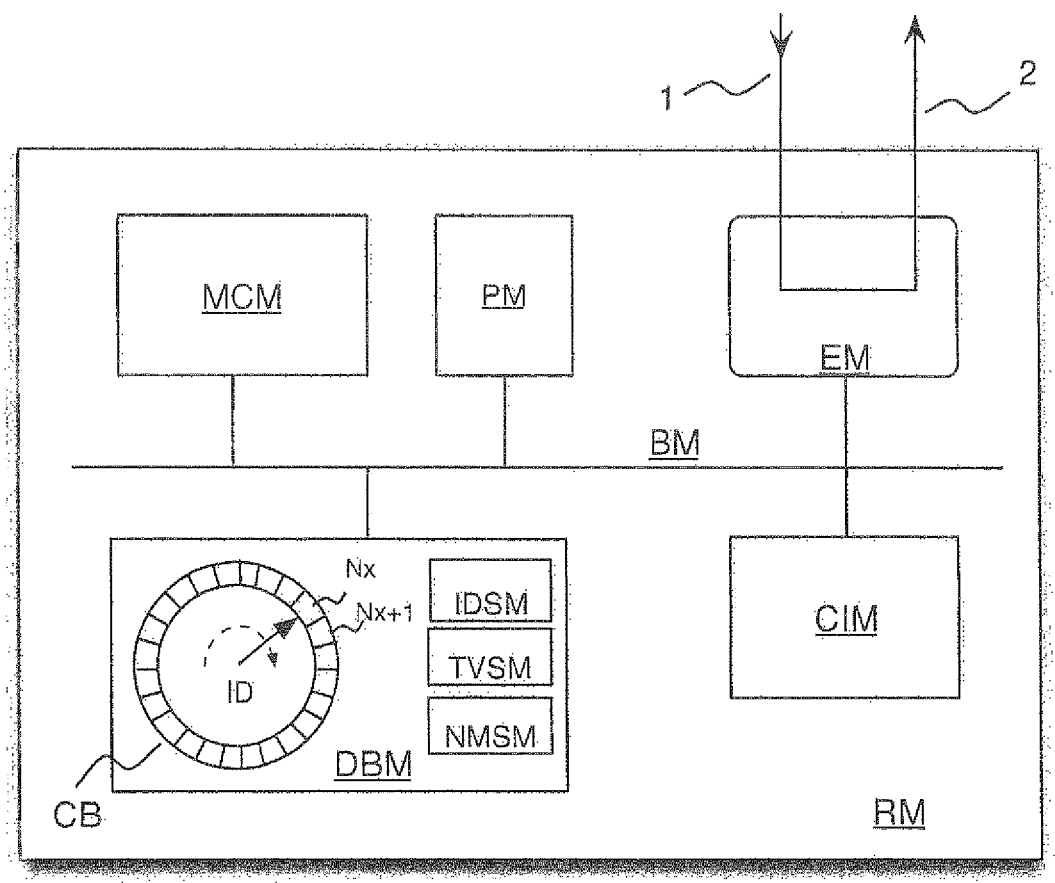
FIG. 4 shows an embodiment of a remote meter according to the invention.

FIG. 4 shows an embodiment of a remote meter RM located inside or outside of customer premises in the network of FIG. 1. In FIG. 4, reference numeral 1 denotes a power line as a part of the low voltage network section. Power supplied through the power line 1 passes through an energy metering unit EM which counts the energy consumed by the electric loads L1, L2, ... shown in FIG. 1. In FIG.

4, MCM denotes a controller of the remote meter, for example a micro controller. DBM denotes a data storage device, e.g. a random access memory, a hard disk drive or the like. PM denotes a program storage location for storing a sequence of instructions to be executed by the micro controller MCM to operate the meter. The micro controller MCM, the data storage device DBM, the program memory PM and the energy metering unit EM are connected with each other through a data bus BM provided in a remote meter RM according to the invention.

In the embodiment shown in FIG. 4, CB denotes a circular buffer providing storage locations N for storing data elements mv(x), mv(x+1) . . . indicating the energy consumption measured by said energy metering unit EM. Under the control of the controller MCM, the measured consumption values mv(x), mv(x+1) . . . are stored in respective storage locations Nx, Nx+1 etc. on a periodical basis, for example in cycles of T minutes, wherein T can be considered a time parameter stored in the remote meter RM. As shown in FIG. 4, the storage location Nx, into which a data element or data set corresponding to the consumption measured during the last measurement cycle has been written by the controller MCM, is identified by a identifier ID, which is stored in an identifier storage means IDSM, so that in a subsequent cycle the controller MCM stores a new data element corresponding to the consumption measured during the subsequent cycle in a subsequent one Nx+1 of said storage locations.

By using a circular buffer CB for storing the consumption related data elements, the memory requirements of the remote meter are limited and impose reduced constraints on the design of the remote meter RM. The circular buffer CB can be embodied in various forms, for example a random access memory, preferably of the non-volatile type like a NAND flash memory. The circular buffer CB needs not to be embodied in a separate component as it is possible for those skilled in the art to implement the circular buffer CB in the data storage device DBM of the remote meter by means of software under the control of controller MCM, as indicated in FIG. 4.

At the end of each of the above measurement cycles, the controller MCM updates the identifier ID to point at the next storage location so that the identifier ID indicates the storage location of the last stored data element, which corresponds to the consumption measured during said measurement cycle. The identifier ID is stored in said identifier storage location IDSM, preferably a memory location of the data storage device DBM, as shown in FIG. 4. Further, a time value TV representing the date and time of the storing of the last stored data element is updated and stored in a time value storage means TVSM, preferably a memory location of the data storage device DBM, as also shown in FIG. 4. According to the invention, at the end of each measurement cycle the a data element corresponding to the consumption measurement for that cycle is stored in a storage location which is identified by said identifier ID stored in said identifier memory location IDSM and for which date and time of the measurement is stored in said time value memory location TVSM.

In FIG. 4, CIM denotes a power line communication interface of the remote meter RM. The communication interface CIM listens to data messages on the power line 1 and receives broadcast data messages or messages addressed to the remote meter. Such messages will be passed on by the communication interface CIM for further processing by the micro controller MCM and its associated peripherals. Data messages on the power line 1 not addressed to the remote meter will be ignored by the power line communication interface CIM or at a later stage during the processing by the micro controller MCM. Messages generated by the remote meter RM are converted by the communication interface CIM into signals suitable for transmission over the power line 1. To perform these tasks, the communication interface CIM is connected to the common system bus BM of the remote meter RM and implements any suitable communication protocol in accordance with the communication protocol implemented in the concentrator C.

If a message addressed to the remote meter RM is received from the concentrator C requesting the transmission of the identifier ID and the time value TV, i.e. of status data, the controller MCM in the remote meter RM reads out the respective data from said identifier memory location IDSM and said time value memory location TVSM. Then, the controller MCM supplies the identifier ID and the time value TV to the communication interface CIM for being transmitted to the requesting concentrator C.

According to a first option, if a message addressed to the remote meter RM is received from the concentrator C requesting the transmission of data elements stored in the circular buffer from a start time value to an end time value, the controller MCM determines the storage location that corresponds to the start time value, typically on the basis of the time value stored in the time value storage means TVSM and the cycle time period T. Then, the controller MCM reads out the data elements stored in respective storage locations of the circular buffer CB between the computed storage location and the storage location identified by identifier ID. Finally, the controller MCM supplies the data elements to the communication interface CIM for being transmitted to the requesting concentrator C.

According to a second option, if a message addressed to the remote meter RM is received from the concentrator C requesting the transmission of a number L of data elements stored in the circular buffer CB, the controller MCM reads out the most recent data element and L−1 data elements stored in L−1 precedent storage locations of the circular buffer CB. Then, the controller MCM supplies the L data elements to the communication interface CIM for being transmitted to the requesting concentrator C.

According to a third option, if a message addressed to the remote meter RM is received from the concentrator C requesting the transmission of data elements stored in the circular buffer CB beginning with a storage location transmitted from the concentrator C, the controller MCM reads out the data elements from the storage location given in the concentrator message to the storage location of the last stored data element of the circular buffer CB. Then, the controller MCM supplies the data elements to the communication interface CIM for being transmitted to the requesting concentrator C.

According to a fourth option, if a message addressed to the remote meter RM is received from the concentrator C requesting the transmission of data elements stored in the circular buffer CB within a given range of storage locations, information regarding said range being transmitted from the concentrator C, the controller MCM of the remote meter RM reads out the data elements from the range of storage locations of the circular buffer CB as provided in the concentrator message. Then, the controller MCM supplies the data elements to the communication interface CIM for being transmitted to the requesting concentrator C.

Obviously, since the exact storage locations are determined by the concentrator C according to the third and fourth option above, such computations need not to be performed by the remote meter RM so that the requirements regarding the computation power of the controller MCM at the remote meter RM are less severe whereby the hardware costs of a remote meter can be reduced.

If the concentrator C provides information regarding the exact storage locations, the concentrator C determines this information preferably on the basis of a start time and an end time of the desired measurement period, e.g. one week, one month or one year, and the cycle time T of the repetitive measurements performed by the remote meter RM as well as the identifier ID, i.e. status data, received from the remote meter.

Figure 5:
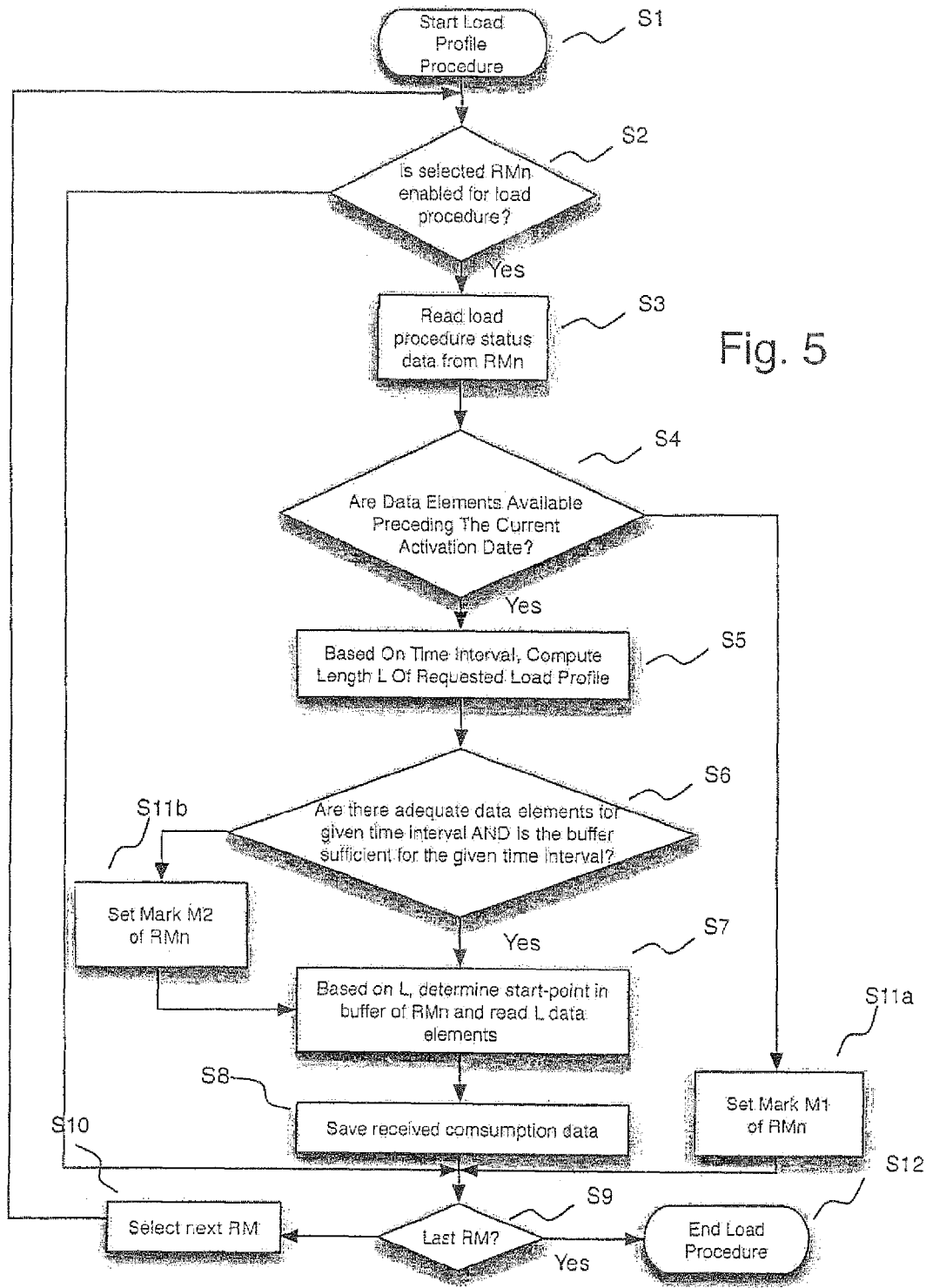
FIG. 5 shows a flow chart illustrating an example of a load procedure performed by a concentrator and the associated remote meters according to the invention.

FIG. 5 shows a flow chart according to an embodiment of the invention to illustrate operations performed by the concentrator C administrating several remote meters RM. The concentrator C starts the load profile procedure (operation S1) to obtain consumption data MV1, MV2 . . . MV(L) from remote meters RM for a given time interval, i.e. a consumption related data profile.

The concentrator C determines whether a selected remote meter RMn is enabled for the load profile procedure (operation S2). Preferably, the concentrator C determines whether the remote meter RMn is enabled for the load procedure by looking up a respective entry in a record maintained for the respective remote meter RMn in the concentrator data storage device.

If the remote meter RMn is not capable of taking part in the load profile procedure, the concentrator C continues with the determination whether the last of the remote meters RM associated with the concentrator C has been processed in the load procedure (operation S9). If the last remote meter has been processed, the concentrator C stops the load profile procedure (operation S12). If the last of the remote meters RM has not yet been processed, the concentrator C selects the next remote meter RMn+1 to be processed (operation S10) and returns to the beginning (operation S2) of the load profile procedure.

If the concentrator C determines that a selected remote meter RMn is enabled for the load profile procedure, the concentrator C reads status data from the remote meter RMn (operation S3) by transmitting a status data request to the remote meter RMn and receiving status data from the remote meter RMn (see also operations O1 to O3 in FIG. 3). The status data may comprise one or more of a time value TV, an identifier ID and a numeric value NV as described above as well as additional status data.

Based on the received status data, the concentrator C determines (operation S4) whether there are any data elements stored in the remote meter RMn which precede the activation date/time of the load profile procedure.

If there are no data elements available, the concentrator C stores a respective mark M1 in the record maintained in the concentrator data storage device for the remote meter RMn and (operation S11a) and continues with the determination whether the last one of the remote meters RM has been processed in the load procedure (operation S9). If the last remote meter RM has been processed, the concentrator C stops the load profile procedure (operation S12), but if the last remote meter RM has not yet been processed, the concentrator C selects the next remote meter RMn+1 to be processed (operation S10) and returns to the beginning of the load profile procedure (operation S2).

If the concentrator C determines that consumption related data elements stored in the remote meter RMn preceding the activation date/time of the load profile procedure are available (operation S4), the concentrator C computes the length of the load profile to be requested, i.e. the number L of data elements to be transmitted from the remote meter RMn, based on the time interval (operation S5). The concentrator C determines whether there are adequate data elements for the predetermined time interval and whether the total number of storage locations in the storage buffer of the remote meter RMn is sufficient to provide data elements for the predetermined time interval (operation S6).

If either one or both aspects are not confirmed, the concentrator C stores a respective mark M2 in the records maintained in the concentrator data storage device for the remote meter RMn (operation S11b) and continues with the determination whether the last remote meter RM has been processed in the load profile procedure (operation S9) and if the last remote has been processed, the concentrator C stops the load procedure (operation S12), but if the last remote meter has not yet been processed, the concentrator C selects the next remote meter RMn+1 to be processed (operation S10) and returns to the beginning (operation S2).

If both aspects are confirmed (operation S6), the concentrator C determines the correct start storage location in the storage buffer CB of the remote meter RMn, based on number L and identifier ID, and obtains the data elements from the start storage location to the storage location identified by identifier ID (operation S7) by transmitting the start storage location to the remote meter RMn and requesting the transmission of the respective data elements. After having received the requested consumption related data elements MV1, MV2 . . . MV(L) the concentrator C saves the data in the concentrator storage means DBC.

The invention claimed is:

1. A method of remote metering the consumption of utilities distributed through a public distribution network to a plurality of consumers, each consumer being associated with at least one remote meter, each of said remote meters including a program memory, a controller that executes programs stored in said program memory, and a data element memory that stores data elements indicative of the consumption of said utilities, said method comprising:
   each of the plurality of remote meters measuring a consumption of said utilities and storing utility consumption related data for reporting such data to a concentrator associated with said
   plurality of remote meters,
   said concentrator communicating with said plurality of remote meters, collecting utility consumption related data, performing tasks concerning administration of its associated remote meters, transmitting a first request for status data to one of the plurality of remote meters, and transmitting a second subsequent request indicating an amount of utility consumption related data to said one of the plurality of remote meters, and
   said one of the plurality of remote meters transmitting said requested status data in response to the first request and subsequently transmitting said amount of utility consumption related data to said concentrator in response to the second request from said concentrator, said amount being determined at the collector on the basis of said status data received from said one remote meter in the first request,
   wherein the status data comprises one or more of a time value indicating a date and time of most recently measured utility consumption related data and an indicator indicating a storage location at the one remote meter of the most recently measured utility consumption related data.

2. A method according to claim 1, further comprising said concentrator determining the amount of utility consumption related data also on the basis of one or more parameters, including a time interval, previously stored in said concentrator.

3. A method according to claim 1, wherein the status data further includes a numeric value indicating the number of stored utility consumption related data at the one remote meter.

4. A method according to claim 1, further comprising the concentrator transmitting a start time and an end time to the one remote meter requesting transmission of utility consumption related data from said start time to said end time.

5. A method according to claim 1, further comprising the concentrator transmitting a number of storage locations to the one remote meter requesting transmission of utility consumption related data stored in respective storage locations at the one remote meter.

6. A method according to claim 1, further comprising the concentrator transmitting values indicating storage locations to the one remote meter requesting transmission of utility consumption related data stored in the storage locations indicated by said values.

7. A method according to claim 1, further comprising the concentrator determining, on the basis of said status data, whether sufficient utility consumption related data are stored at the one remote meter.

8. A method according to claim 1, further comprising the concentrator determining whether the one remote meter is enabled to transmit the amount of utility consumption related data to said concentrator.

9. A system for remote metering the consumption of utilities distributed through a public distribution network of a plurality of consumers, the system comprising:
- a plurality of remote meters configured to measure a consumption of utilities, each of said remote meters having a controller and a program memory, said controller configured to execute programs stored in said program memory, and a data element memory configured to store data elements indicative of the consumption of said utilities; and
- a concentrator configured to communicate with said plurality of remote meters in order to collect consumption data, to perform tasks related to administration of associated remote meters, to transmit a first request for status data to one of the plurality of remote meters, and to transmit a second subsequent request indicating an amount of utility consumption related data to said one of the plurality of remote meters;
- wherein said one of the remote meters of the system is configured to transmit said requested status data in response to the first request and to subsequently transmit said amount of utility consumption related data to said concentrator in response to the second request from said concentrator, and wherein said concentrator is configured to determine said amount on the basis of said status data received from said one of the remote meters in the first request,
- wherein the status data comprises one or more of a time value indicating date and time of most recently measured utility consumption related data and an indicator indicating a storage location at the remote meter of the most recently measured utility consumption related data.

10. The system according to claim 9, wherein said concentrator is configured to determine the amount of utility consumption related data also on the basis of one or more parameters, including a time interval, previously stored in said concentrator.

11. The system according to claim 9, wherein the status data further comprises a numeric value indicating a number of stored utility consumption related data at said one of the remote meters.

12. The system according to claim 9, wherein the concentrator is configured to transmit a start time and an end time to said one of the remote meters requesting transmission of utility consumption related data from said start time to said end time.

13. The system according to claim 9, wherein the concentrator is configured to transmit a number of storage locations to said one of the remote meters requesting transmission of utility consumption related data stored in respective storage locations at the one remote meter.

14. The system according to claim 9, wherein the concentrator is configured to transmit values indicating storage locations to said one of the remote meters requesting transmission of utility consumption related data stored in the storage locations indicated by said values.

15. The system according to claim 9, wherein the concentrator is configured to determine, on the basis of said status data, whether sufficient utility consumption related data are stored at said one of the remote meters.

16. The system according to claim 9, wherein the concentrator is configured to determine whether said one of remote meters is enabled to transmit the amount of utility consumption related data to said concentrator.

17. A concentrator for collecting data regarding the consumption of utilities from a plurality of remote meters, each having a controller and a program memory, said controller configured to execute programs stored in said program memory, and a data element memory configured to store data elements related to the consumption of said utilities and at least indicative of the consumption of said utilities, said concentrator comprising:
- a communication interface configured to communicate with said plurality of remote meters;
- a controller configured to process data received from said remote meters through said communication interface;
- wherein said concentrator is configured to:
- request status data from a selected one of said remote meters in a first request;
- compute an amount of utility consumption related data to be requested and received from said selected remote meter on the basis of said requested status data received from said selected remote meter in said first request;
- request said amount of utility consumption related data from said selected one of said remote meters in a second subsequent first request, and
- receive said amount of utility consumption related data from said selected remote meter, wherein the status data comprises one or more of a time value indicating date and time of most recently measured utility consumption related data and an indicator indicating a storage location at the remote meter of the most recently measured utility consumption related data.

18. The concentrator according to claim 17, further configured to determine the amount of utility consumption related data also on the basis of one or more parameters, including a time interval, previously stored in said concentrator.

19. The concentrator according to claim 17, wherein the status data further comprises a numeric value indicating the number of stored utility consumption related data at the selected remote meter.

20. The concentrator according to claim 17, further configured to transmit a start time and an end time to the selected remote meter requesting transmission of utility consumption related data from said start time to said end time.

21. The concentrator according to claim 17, further configured to transmit a number of storage locations to the selected remote meter requesting transmission of utility consumption related data stored in respective storage locations at the remote meter.

22. The concentrator according to claim 17, further configured to transmit values indicating storage locations to the selected remote meter requesting transmission of utility consumption related data stored in the storage locations indicated by said values.

23. The concentrator according to claim 17, further configured to determine, on the basis of said status data, whether sufficient utility consumption related data are stored at the selected remote meter.

24. The concentrator according to claim 17, further configured to determine whether the selected remote meter is enabled to transmit the amount of utility consumption related data to said concentrator.

25. A remote meter for measuring the consumption of utilities, comprising:
- a communication interface configured to transmit data concerning the measured consumption of utilities to a concentrator;
- a utility consumption related data element memory comprising a plurality of storage locations configured to store data elements indicative of the consumption of said utilities measured at a time of storing respective ones of said data elements;
- a time value memory configured to store a time value corresponding to the date/time of storing of a most recent utility consumption related data element; and
- a controller configured to measure consumption of utilities as indicated by a stored time parameter and store a data element corresponding to the measured consumption of utilities in a respective one of said storage locations of said utility consumption related data element memory, and update the time value stored in said time value memory to correspond to the time of storing of said most recent data element; and
- a transmitter configured to
- transmit status data indicating a date and time of most recently measured utility consumption related data and indicating a storage location at the one remote meter of the most recently measured utility consumption related data in response to a first request from said concentrator,
- transmit an amount of utility consumption related data to said concentrator via said communication interface in response to a second subsequent request from said concentrator, said amount including the time value and a number of data elements stored in said storage locations to said concentrator, said time value and said number being determined by said concentrator on the basis of the status data.

26. The remote meter according to claim 25, further comprising an identifier memory configured to store an identifier identifying the storage location of said plurality of storage locations in which a most recent data element has been stored; and
- said controller being further configured to periodically update the identifier stored in said identifier memory to identify said one of said storage locations as the one containing the most recent data element, and
- the transmitter being further configured to transmit the identifier to said concentrator via said communication interface in response to a respective request from said concentrator.

27. The remote meter according to claim 25, wherein said utility consumption related data element memory is a circular buffer.

28. The remote meter according to claim 25, wherein the transmitter is further configured to transmit utility consumption related data from a start time to an end time received from the concentrator.

29. The remote meter according to claim 25, wherein the transmitter is further configured to transmit utility consumption related data stored in storage locations at the remote meter said number of storage locations received from the concentrator.

30. The remote meter according to claim 25, wherein the transmitter is further configured to transmit utility consumption related data stored in the storage locations indicated by values received from the concentrator.

* * * * *